Aug. 9, 1960 D. M. HAWLEY 2,948,080
FISHING TACKLE CASE
Filed Feb. 24, 1956 2 Sheets-Sheet 1

INVENTOR:
DON M. HAWLEY
BY
Marzall, Johnston, Cook & Root
ATT'YS

Aug. 9, 1960     D. M. HAWLEY     2,948,080
FISHING TACKLE CASE
Filed Feb. 24, 1956     2 Sheets-Sheet 2
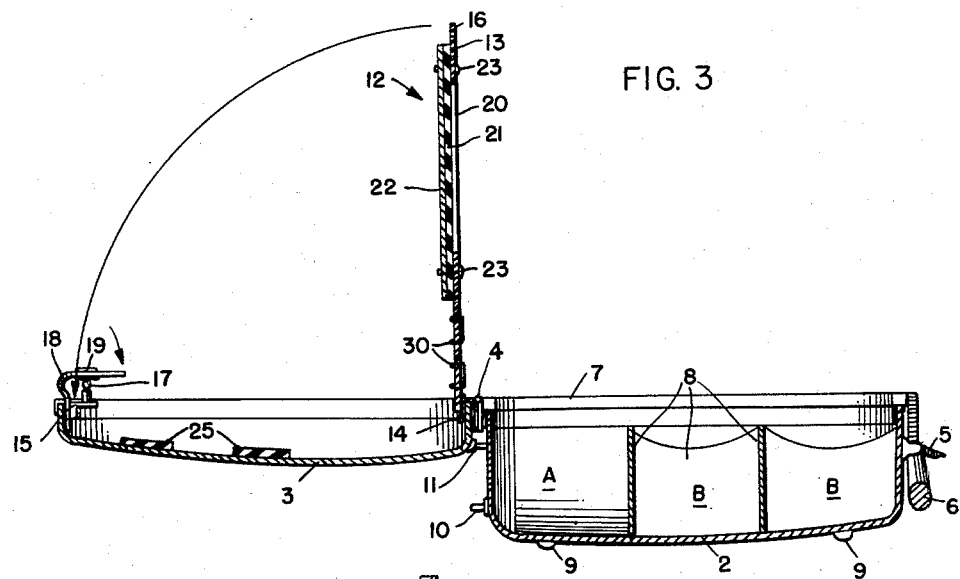
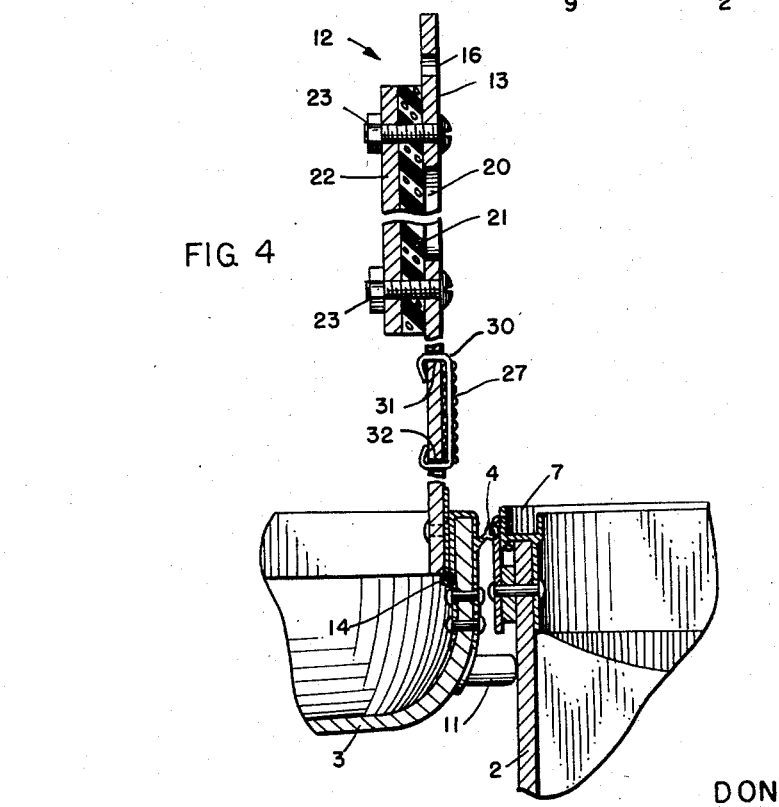
INVENTOR:
DON M. HAWLEY
BY
ATT'YS

United States Patent Office 2,948,080
Patented Aug. 9, 1960

2,948,080

FISHING TACKLE CASE

Don Milligan Hawley, Geneva, Ill., assignor to Hawley Products Company, St. Charles, Ill., a corporation of Delaware Filed Feb. 24, 1956, Ser. No. 567,540

1 Claim. (Cl. 43—54.5)

This invention relates to a fishing tackle case, and more particularly to novel means contained therein for carrying various articles of fishing gear.

One object of the invention is to provide a fishing tackle case which will display various articles of fishing gear for rapid selection.

Another object of the invention is to provide a fishing tackle case in which various articles of fishing gear can be rapidly assembled and packed in an organized manner for a fishing expedition.

Still another object of the invention is to provide a fishing tackle case in which individual fishing lures and the like can be displayed separately and in full view with means for rapidly engaging or disengaging them from their carrying position.

Yet another object of the invention is to provide a safe means of handling fishhooks as individual items or as components of fishing lures and the like.

These and other objects and advantages of the invention will be more clearly understood upon a consideration of the following description taken together with the accompanying drawings wherein similar reference figures are employed to designate similar parts in all of the figures, and in which:

Fig. 3 is a cross-sectional view of the fishing tackle case taken on line 3—3 of Fig. 2; and Fig. 4 is an enlarged cross-sectional view of fragmentary portions of Fig. 3.

Figure 1:
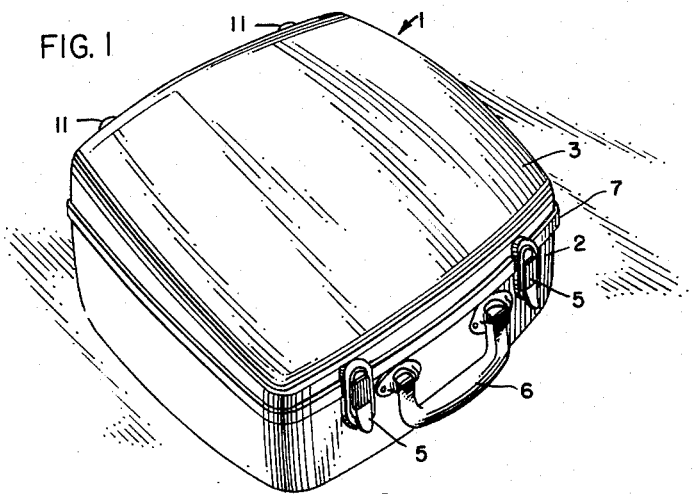
Fig. 1 is a perspective view of one embodiment of the invention illustrating a fishing tackle case in a closed position.

In accordance with the invention, a fishing tackle case is provided which contains novel means therein for carrying an assortment of fishing gear including means mounted on the inner surface of a cover member and/or mounted on a divider panel adapted to receive a plurality of fishhooks imbedded therein in hook engagement, and elastic band means on a divider panel so constructed and arranged as to hold individual containers against the divider panel. The fishing tackle case itself is advantageously in the form of a carrying case having a base member separable from a cover member with means connecting one edge of a divider panel in the case for rotatable movement of the panel.

Referring to the drawings, a fishing tackle case is shown as a carrying case 1 in which a base member 2 is separable from a cover member 3, the base and cover members preferably being hinged at one of their contiguous edges by a case hinge means 4. A latch means 5 is provided on the side of the carrying case opposite the case hinge means to secure the case in a closed position. The case preferably has mounted thereon a suitable handle 6 for carrying purposes. A frame 7 is very advantageously provided for fitting the cover member to the base member.

Figure 2:
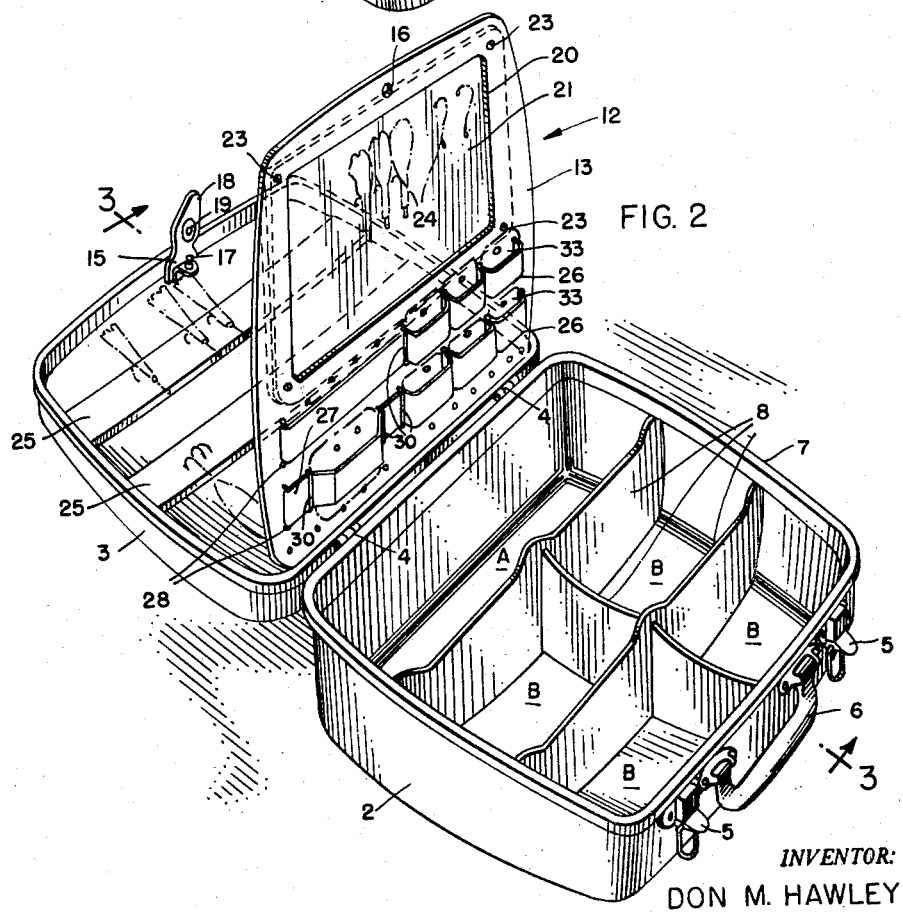
Fig. 2 is a perspective view of the same in an open position.

The base member 2 is shown in Fig. 2 with its interior divided into a number of sections or compartments by interlocking sectional panels 8. One compartment A is preferably of sufficient size to accommodate a hammer, pliers, scissors, and other auxiliary equipment frequently carried by fishermen. Smaller compartments B are provided for a fishing reel and similar bulky items.

As illustrated in Fig. 3, the base member 2 has four base knobs 9 upon which the case can rest in a horizontal position. Likewise, two base studs 10 and two cover studs 11 are provided to rest the case in a vertical position. The cover studs 11 also serve to maintain the cover member 3 in an approximately horizontal position when the case is fully opened to prevent excessive strain on the case hinge means 4 and also to permit a divider panel 12 to assume a substantially perpendicular position to the horizontal plane of the carrying case as will be more fully described hereinafter.

The divider panel 12 provided by the invention and illustrated in Figs. 2, 3 and 4 is represented by a substantially flat, rectangular supporting member 13. Panel hinges 14 connect one edge of the panel in the carrying case for rotatable movement of the panel, preferably so that the panel will rotate through an arc of about 90° as shown by the arrow in Fig. 3. The panel can be connected to the cover member as shown or, alternatively, can be connected in the base member in a similar manner.

When the case is in a fully opened condition, the divider panel 12 can be maintained in a balanced upright position by constructing the panel hinge 14 in such a manner that the panel inclines slightly toward the base member 2. This upright position can also be attained by utilizing cover studs 11 of a length which, when resting against the base member 2, will tip the cover member 3 slightly out of a horizontal position such that the divider panel, in perpendicular relationship to the cover member, will also be tipped slightly toward the base member 2 in order to be balanced. It is also contemplated to provide conventional means for fastening the divider panel in an upright position, such as additional supporting struts, straps, or the like, detachably connecting the panel and the base or cover member. Generally, it is desired that the divider panel be permitted to assume a position approximately perpendicular to the cover member in order to provide convenient access to the inner surface of the cover member.

To hold the divider panel in a closed position, a snap fastener 15 or other suitable holding means removably fastens the panel in the cover member of the case to prevent rotatable movement of the panel. The upper edge of the flat, supporting member 13 is provided with a hole 16 adapted to fit over the male member 17 of the snap fastener 15, a flexible strap 18 containing a female member 19 snapping over the protruding male member 17 to hold the panel securely in place.

The upper half of the divider panel is cut away to provided a substantially rectangular opening 20. A flat, easily puncturable material 21, such as foam rubber, cork or the like, is mounted on that side of the panel facing the cover member 3 such that the material 21 overlaps the edge of the opening 20, and is held in place by a rigid back plate 22 of any suitable material having approximately the same dimensions as the puncturable material 21. Four bolts and nuts 23 secure the assembly in place, thus permitting the puncturable material to be replaced if necessary because of extended use.

By "puncturable material" is meant a material in which fishhooks can be easily imbedded in hook engagement. Common materials would include sponge rubber, cork, felt, balsa wood, and other natural and synthetic materials of a similar character.

The term "fishhooks" is used herein in its generic sense, i.e. a fishhook as an individual item or as a component of a fishing lure, artificial fly, or the like. A plurality of fishhooks 24 can thus be imbedded in the puncturable material in hook engagement as indicated by the dotted lines in Fig. 2. The fishhooks are arranged for display in an orderly fashion and can be quickly and safely disengaged without becoming entangled with other fishhooks, particularly with lures having more than one fishhook.

Two rectangular strips 25 of puncturable material are shown to be attached to the inner surface of the cover member 3 by any suitable means such as gluing, bolting, or the like, in order to provide additional space for receiving a plurality of fishhooks. If desired, the fishing tackle case can then be used without a divider panel where such hook engaging means on the cover member provides sufficient space. However, the presence of a divider panel is particularly adapted to form a protective covering and pressing support for fishhooks in the cover member when the panel is in a closed position. The fishhooks carried in the cover member are readily accessible by rotating the divider panel to an upright or fully open position.

The lower half of the divider panel 12 contains novel means for carrying a plurality of individual containers 26 in which smaller items of fishing gear such as sinkers, leaders, and the like can be kept. A continuous endless elastic band 27 is stretched flat against the supporting member 13 and held in expansion by outer rods or clamping means 28 fastened to the supporting member 13 and pressing laterally outwardly against opposing loops or ends 29 of the endless band. Inner rods or clamping means 30 are adapted to hold the elastic band 27 tightly on either side of an individual container 26 which is inserted between the band 27 and the supporting member 13.

Each rod 28 or 30 is initially constructed in the form of a U-shaped staple which can be inserted through a pair of holes, an upper hole 31 and a lower hole 32, spaced a distance apart slightly greater than the width of the elastic band 27. A plurality of these paired holes are spaced along the length of the elastic band at regular intervals intermediate the ends of the band so as to accommodate various sizes of individual containers. The rods 28 and 30 are securely fastened by bending the ends back against the supporting member 13 on the side opposite the band 27. The elastic band is thus free to slip under the rods when stretched while being held tightly against the supporting member.

The individual containers 26 are shown to be generally rectangular in shape and provided with a hinged top 33 which can be opened while the container is held in place. It is also advantageous to employ transparent containers so that the contents can be readily observed, particularly if the bottom of each container is permitted to project a short distance below the enclosing elastic band. Containers having shapes other than rectangular are equally adaptable to being held in position by an elastic band in the manner described above.

It will be readily observed that the fishing tackle case of the invention provides a compact carrying case which is most practical in carrying a large assortment of fishing gear. The various components of fishing tackle are systematically arranged for convenient access while avoiding gear entanglement. The ease, safety, and convenience with which individual items can be removed and replaced aid in the proper care and protection from damage or loss of valuable fishing equipment.

The invention is hereby claimed as follows:

In combination with a fishing tackle carrying case, a divider panel comprising a substantially flat supporting member having a cut-away portion in approximately one-half thereof and having a piece of puncturable material removably secured over said cut-away portion, said puncturable material being capable of holding fishhooks attached thereto from either side of said panel, said supporting member being provided with a plurality of paired holes regularly spaced across the remainder of said supporting member in two parallel lines generally parallel to one of the sides of said cut-away portion, a continuous endless elastic band for holding small individual containers stretched flat against said supporting member between said parallel lines and means for holding said band on said supporting member comprising two outer rods which press laterally outwardly against the opposing looped ends of said band, and a plurality of removable inner rods intermediate the looped ends of said band secured to said supporting member and transversely pressing said band against said supporting member at points adjacent either side of said individual containers, each of said rods having ends inserted through a pair of said holes located transversely with respect to said band and then fastened to said supporting member, said elastic band slipping freely under each of the fastened rods.

References Cited in the file of this patent

UNITED STATES PATENTS

| | | |
|---|---|---|
| 206,206 | Yerrinton | July 23, 1878 |
| 417,979 | Borcherdt | Dec. 24, 1889 |
| 577,483 | Kirschner | Feb. 23, 1897 |
| 639,030 | Haak | Dec. 12, 1899 |
| 893,608 | Danne | July 21, 1908 |
| 1,853,261 | Dawson | Apr. 12, 1932 |
| 1,877,840 | Frowenfeld | Sept. 20, 1932 |
| 1,991,306 | Woolsey | Feb. 12, 1935 |
| 2,125,856 | DeWitt | Aug. 2, 1938 |
| 2,558,124 | Burden | June 26, 1951 |
| 2,645,340 | Dow | July 14, 1953 |